O. A. SMITH.
OVERLOAD CLUTCH DEVICE.
APPLICATION FILED NOV. 22, 1909.

979,104.

Patented Dec. 20, 1910.
2 SHEETS—SHEET 1.

Witnesses:
L. C. Badeau.
H. D. Penny.

Inventor:
Oscar A. Smith,
By his Attorney, T. H. Richards.

O. A. SMITH.
OVERLOAD CLUTCH DEVICE.
APPLICATION FILED NOV. 22, 1909.
979,104.
Patented Dec. 20, 1910.
2 SHEETS—SHEET 2.
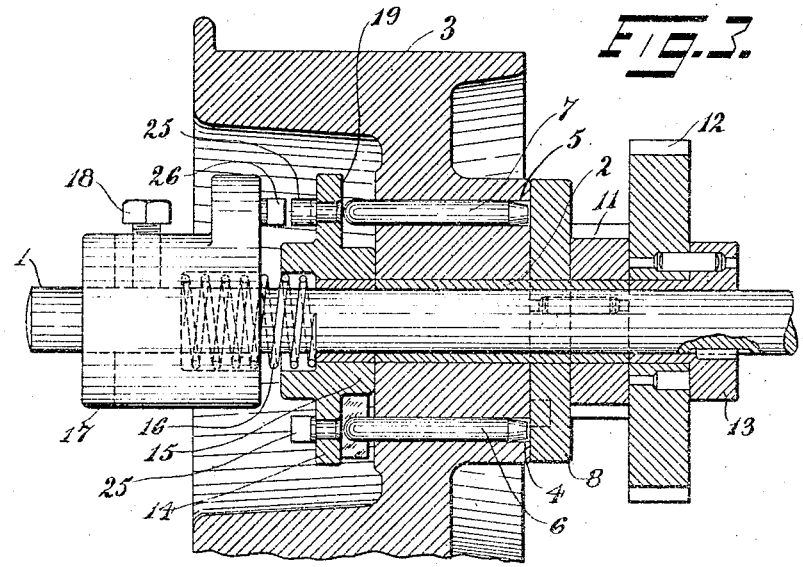
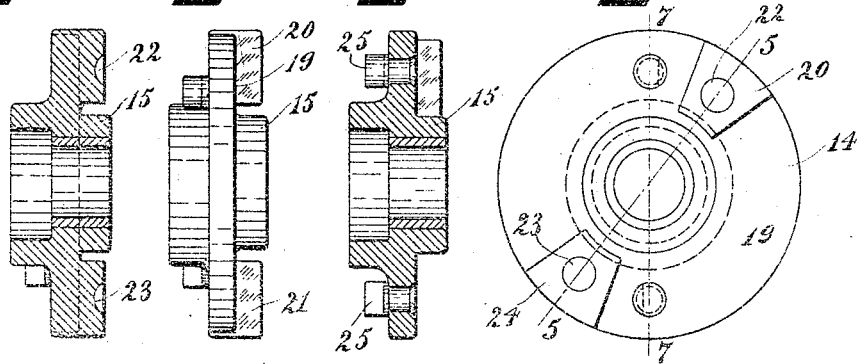
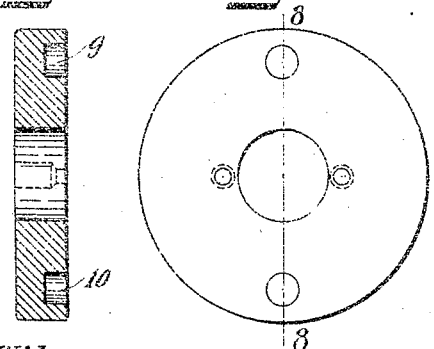
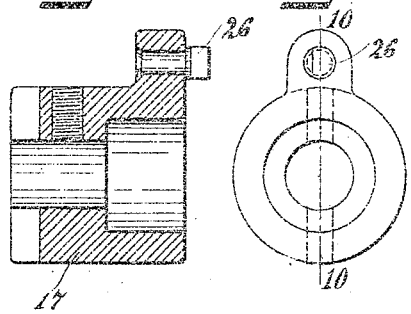
Witnesses:
Inventor:
Oscar A. Smith,
By his Attorney,

UNITED STATES PATENT OFFICE.

OSCAR A. SMITH, OF CLEVELAND, OHIO, ASSIGNOR TO THE NATIONAL-ACME MANUFACTURING COMPANY, OF CLEVELAND, OHIO, A CORPORATION OF OHIO.

OVERLOAD CLUTCH DEVICE.

979,104.   Specification of Letters Patent.   Patented Dec. 20, 1910.

Application filed November 22, 1909. Serial No. 529,215.

*To all whom it may concern:*

Be it known that I, OSCAR A. SMITH, a citizen of the United States, residing in Cleveland, in the county of Cuyahoga and State of Ohio, have invented certain new and useful Improvements in Overload Clutch Devices, of which the following is a specification.

This invention relates to clutch devices that will release upon an abnormal strain or load being placed on a machine to disconnect the driving member from its driven member, thereby preventing breakage of the machine.

The object of the invention is to provide an improved form of such device that will automatically trip upon an overload being exerted and the parts will be thrown out of operative position.

Figure 1:
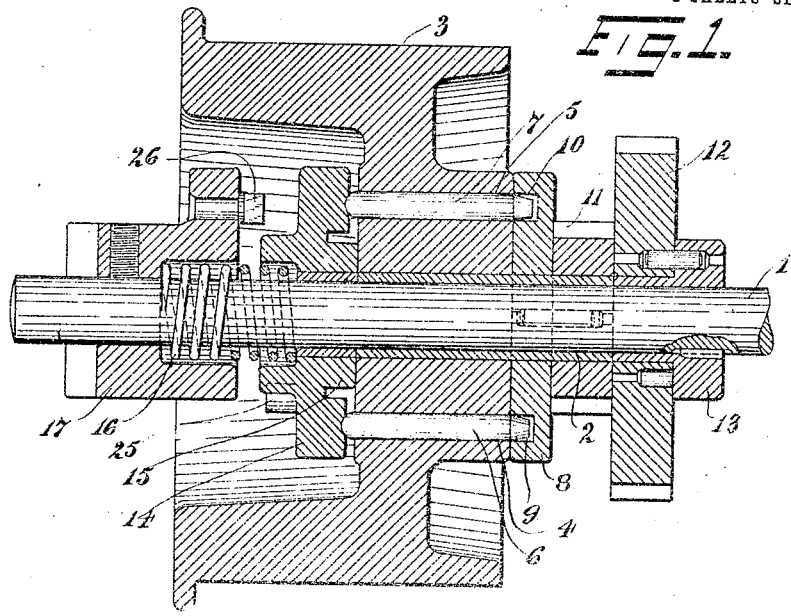
Figure 2:
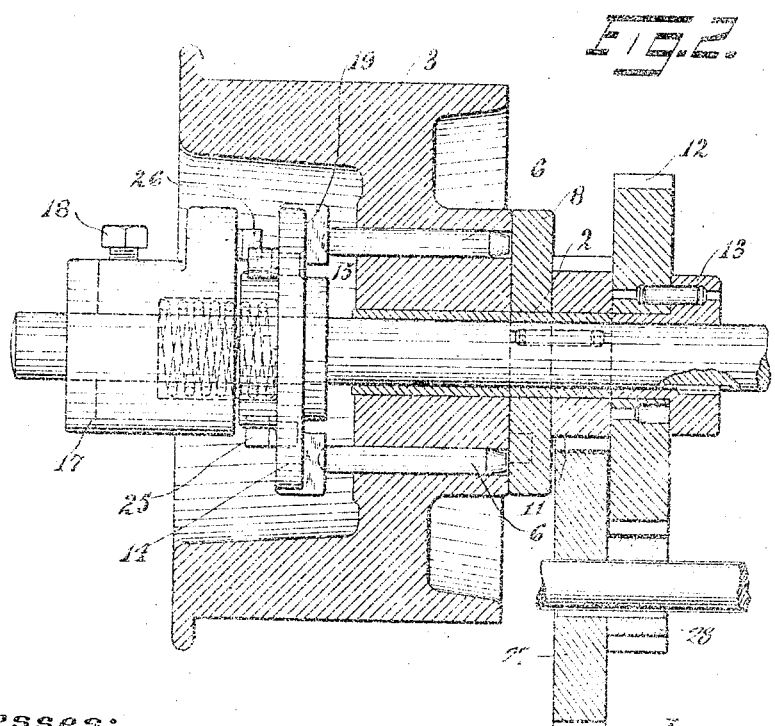

In the accompanying drawing showing an embodiment of my invention Figure 1 is an axial section through a shaft with the device applied. Fig. 2 is a similar view with the parts in another position. Fig. 3 is a similar view with the parts in still another position. Fig. 4 shows in elevation the locking plate. Fig. 5 is a section on the line 5—5 indicated in Fig. 4. Fig. 6 is an elevation of the locking plate shown in Fig. 5. Fig. 7 is another section on the line 7—7 of Fig. 4. Fig. 8 is a section on the line 8—8 of Fig. 9, and Fig. 9 is an elevation of the clutch plate. Fig. 10 shows in section and Fig. 11 in elevation the tripping head.

On the shaft 1 is suitably secured a sleeve 2, on which freely rotates the driving member, shown comprising a pulley 3. In the pulley are a number of passages extending longitudinally, two of them 4 and 5 being shown, in which slide pins 6 and 7. A clutch member 8 is loose on the sleeve 2 adjacent the pulley 3 and is provided with the sockets 9 and 10 arranged to register with and receive the pins 6 and 7 when advanced. A pinion 11 is shown secured to the clutch plate 8, that by a suitable gear 27 and pinion 28, not shown, drive a gear 12, which latter is secured to the head 13 fast on shaft 1. A lock plate 14 is slidable on the shaft 1 on the opposite side of the pulley and normally has its hub 15 pressed against the pulley by a coil spring 16 whose outer end engages a head 17, the latter is shown as locked on the shaft by a set screw 18 whereby it can be quickly released when desired to reset the lock plate and pins after release of the driving pulley. The lock plate 14 has its face 19 adjacent the ends of the pins 6 and 7, provided with a pair of lugs 20 and 21 in position to engage respectively with the adjacent ends of the pins 6 and 7 and retain these pins with their extremities projecting into the sockets 9 and 10 in the clutch plate 8. Preferably shallow depressions 22 and 23 are provided in the face of the lugs for engagement with the similarly rounded ends of the pins to prevent the easy displacement of the pins on the lugs. The opposite face of the lock plate 14 is provided with one or more lugs 25, and the head 17 is provided with a lug 26. These lugs are normally not in position of engagement as indicated in Fig. 1. The head rotating with the shaft will turn at a different speed from the lock plate that rotates with the pulley 3, and hence a rearward movement of the lock plate would cause engagement of these two lugs and result in the head shifting the lock plate rotatively relative to the pulley 3.

In the operation of the device, the parts are normally as indicated in Fig. 1 with the lock plate retaining the pins with their end portions projecting into the sockets in the clutch plate to cause the clutch plate to be driven by the pulley. Preferably the engaging faces of the pins or the clutch plate socket walls, are made somewhat sloping. As shown the pins have their engaging portions slightly conical. Upon overload for any reason on shaft 1, the inclined portions of the pins will cause them to be shifted rearward out of the sockets in the clutch plate whereby the clutch plate is free from the driving pulley. The rearward movement of these pins will force the lock plate 14 axially toward the head and will cause the pins 25 and 26 to be brought into engagement (Fig. 2). If the clutch plate is disengaged and ceases to rotate, the shaft will be arrested and also the head with the pin 26. But the lock plate still rotating with the pulley will have its pin 25 strike the pin 26 to arrest the lock plate. The continued advance of the pins by the rotation of the pulley will shift them beyond the retaining lugs 20 and 21. The rearward movement of the lock plate by the pins causes a further compression of the coil spring 16, and the lugs now being free from the pins, the spring will return the lock plate to its normal position, and the pins will be no longer pressed forward by the lugs. This will bring the parts to the position indicated in Fig. 3, and the lug 26 on the head will no longer engage the lug 25 on the lock plate, and there will be no tendency to advance the pins into the sockets in the clutch plate because the hub of the lock plate will engage the pulley. After the machine has been repaired or fixed and the pulley stopped, the head 17 is released by its set screw 18 and withdrawn a short distance. The pulley is turned relative to the clutch plate until the pins can enter the socket therein, which are forced into the sockets by the engagement of the lugs on the lock plate, and then the head is returned to its former position and locked.

Having thus described my invention, I claim:

1. The combination of a shaft, a driving member loose on the shaft and having longitudinal passages, a pin slidable in each of the passages of the member, a clutch member connected with the shaft and having socket portions to receive the pins when advanced in the said passages in the driving member, and cause the driving member to drive the clutch member, resilient means for normally holding the pins in said driving position whereby the pins can recede into the clutch member upon overload and release the clutch member, and means for disengaging the pins from said resilient means upon disengagement of the clutch member from the driving member and the relative advance rotatively of one of such members.

2. The combination of a shaft, a driving member loose on the shaft and having longitudinal passages, a pin slidable in each of the passages of the member, a clutch member connected with the shaft and having socket portions to receive the pins when advanced in the said passages in the driving member, and cause the driving member to drive the clutch member, resilient means for normally holding the pins in said driving position whereby the pins can recede into the clutch member upon overload and release the clutch member, means for disengaging the pins from said resilient means upon disengagement of the clutch member with the driving member and the relative advance rotatively of one of such members, the clutch member and pins being constructed with one of their engaging faces inclined to the direction of motion to facilitate recession of the pins for disengagement with the clutch.

3. The combination of a shaft, a driving member loose on the shaft and having longitudinal passages, a pin slidable in each of the passages, a clutch member having socket portions arranged to receive the pins when advanced and cause the driving member to actuate the clutch member, a resilient member slidable to engage the ends of the pins and advance them in the driving member to engage the clutch member in the normal position of the resilient member, and means for shifting the resilient member upon disengagement of the clutch member by the pins whereby the resilient member will be out of engaging position to advance the pins.

4. The combination of a shaft, a driving member loose on the shaft and having longitudinal passages, a pin slidable in each of the passages, a clutch member having socket portions arranged to receive the pins when advanced and cause the driving member to actuate the clutch member, a resilient member slidable to engage the ends of the pins and advance them in the driving member to engage the clutch member in the normal position of the resilient member, means for shifting the resilient member upon disengagement of the clutch member by the pins whereby the resilient member will be out of engaging position to advance the pins, the clutch member and pins being constructed with one of their engaging faces inclined to the direction of motion to facilitate recession of the pins for disengagement with the clutch.

5. The combination of a shaft, a driving pulley loose on the shaft and having a number of longitudinal passages, a pin slidable in each of said passages of the pulley, a clutch member connected with the shaft to drive it and having socket portions arranged to receive the pins when advanced in the pulley passages and cause the pulley to drive the clutch member, a lock plate slidable on the shaft in position to engage the ends of the pins not engaged by the clutch member, the lock plate having lugs on its face in position to engage the said pins, a spring engaging the lock plate causing it to press the pins when engaged by the lugs into the sockets in the clutch member, connecting means causing the shaft to be driven from the clutch plate, a head fast on the shaft and arranged to engage the lock plate when advanced by the pins against the pressure of the spring to cause the lock plate to shift and move the lugs away from engagement with the pins thereby permitting the lock plate to be advanced by the spring without forcing the pins into the sockets in the clutch plate.

6. The combination of a shaft, a driving pulley loose on the shaft and having a number of longitudinal passages, a pin slidable in each of said passages of the pulley, a clutch member connected with the shaft to drive it and having socket portions arranged to receive the pins when advanced in the pulley passages and cause the pulley to drive the clutch member, a lock plate slidable on the shaft in position to engage the ends of the pins not engaged by the clutch plate, the lock plate having lugs on its face in position to engage the said pins, a spring engaging the lock plate causing it to press the pins when engaged by the lugs into the sockets in the clutch plate, connecting means causing the shaft to be driven from the clutch plate, a head fast on the shaft and arranged to engage the lock plate when advanced by the pins against the pressure of the spring to cause the lock plate to shift and move the lugs away from engagement with the pins thereby permitting the lock plate to be advanced by the spring without forcing the pins into the sockets in the clutch plate, the head being shiftable to reset the lock plate.

7. The combination of a shaft, a sleeve fast on the shaft, a driving pulley loose on the sleeve and having longitudinal passages, a pin slidable in each of the passages, a clutch member connected with the sleeve to drive it and having socket portions arranged to receive the pins when advanced in the pulley passages, and cause the pulley to drive the clutch member, a lock plate slidable on the shaft in position to engage the ends of the pins not engaged by the clutch plate, the lock plate having lugs on its face in position to engage the said pins, a spring on the shaft engaging the lock plate causing it to press the pins when engaged by the lugs into the sockets in the clutch plate, connecting means causing the shaft to be driven from the clutch plate, a head fast on the shaft and arranged to engage the lock plate when advanced by the pins against the pressure of the spring to cause the lock plate to shift and move the lugs away from engagement with the pins thereby permitting the lock plate to be advanced by the spring without advancing the pins into the sockets in the clutch plate.

8. The combination of a shaft, a driving pulley loose on the shaft and having longitudinal passages, a pin slidable in each of the passages, a clutch member connected with the sleeve to drive it and having socket portions arranged to receive the pins when advanced in the pulley passages and cause the pulley to drive the clutch member, a lock plate slidable on the shaft in position to engage the ends of the pins not engaged by the clutch plate, the lock plate having lugs on its face in position to engage the said pins, a spring on the shaft engaging the lock plate causing it to press the pins when engaged by the lugs into the sockets in the clutch plate, connecting means causing the shaft to be driven from the clutch plate, a head fast on the shaft and arranged to engage the lock plate when advanced by the pins against the pressure of the spring to cause the lock plate to shift and move the lugs away from engagement with the pins thereby permitting the lock plate to be advanced by the spring without advancing the pins into the sockets in the clutch plate.

9. The combination of a shaft, a driving pulley loose on the shaft and having a number of longitudinal passages, a pin slidable in each of said passages, a clutch member connected with the shaft to drive it and having a number of socket portions arranged to receive the pins when advanced in the pulley passages and cause the pulley to drive the clutch member, a lock plate slidable on the shaft in position to engage the ends of the pins not engaged by the clutch plate, the lock plate having lugs on its face in position to engage the said pins, a spring on the shaft engaging the lock plate causing it to press the pins when engaged by the lugs into the sockets in the clutch plate, connecting means causing the shaft to be driven from the clutch plate, a head fast on the shaft, a pin on the head, a pin on the lock plate arranged to engage the pin on the locking plate when advanced by the said clutch pins against the pressure of the spring, causing the locking plate to shift and move the lugs away from engagement with the pins thereby permitting the lock plate to be advanced by the spring without forcing the clutch pins into the sockets in the clutch plate.

OSCAR A. SMITH.

Witnesses:
  A. W. HENN,
  PAUL E. RYAN.